United States Patent [19]
Epperson

[11] Patent Number: 5,346,158
[45] Date of Patent: Sep. 13, 1994

[54] CASTING REEL WITH AUTOMATIC DRAG AND CASTING MECHANISM

[75] Inventor: Frank E. Epperson, Aurora, Colo.

[73] Assignee: F.M.&G., Inc., Aurora, Colo.

[21] Appl. No.: 960,137

[22] Filed: Oct. 13, 1992

Related U.S. Application Data

[63] Continuation-in-part of Ser. No. 714,689, Jun. 13, 1991, abandoned.

[51] Int. Cl.⁵ .......................................... A01K 89/015
[52] U.S. Cl. .................................. 242/236; 242/234; 242/237; 242/265
[58] Field of Search .................. 242/234, 236–240, 242/244, 245, 246, 265, 266, 268

[56] References Cited

U.S. PATENT DOCUMENTS

| | | | |
|---|---|---|---|
| 1,987,713 | 1/1935 | Scott | 242/265 |
| 2,162,726 | 6/1939 | King | 242/84.5 |
| 2,569,006 | 9/1951 | King | 242/265 |
| 2,981,495 | 4/1961 | King | 242/84.54 |
| 3,085,766 | 4/1963 | Salmivuori | 242/242 X |
| 3,094,296 | 6/1963 | Nurmse | 242/242 |
| 3,143,315 | 8/1964 | Harrington et al. | 242/266 |
| 3,297,275 | 1/1967 | Sarah | 242/266 |
| 3,325,117 | 6/1967 | Hiromitsu | 242/84.54 |
| 3,326,492 | 6/1967 | Murvall | 242/84.54 |
| 3,329,373 | 7/1967 | Wood, Jr. | 242/245 |
| 3,429,521 | 2/1969 | Jones | 242/84.54 |
| 3,697,011 | 10/1972 | Christensen et al. | 242/244 X |
| 4,278,217 | 7/1981 | Blackwell | 242/217 |
| 4,285,476 | 8/1981 | Baenziger | 242/234 |
| 4,328,937 | 5/1982 | Holahan et al. | 242/265 |
| 4,352,474 | 10/1982 | Kovalovsky | 242/218 |
| 4,657,201 | 4/1987 | Munroe | 242/84.5 R |
| 4,725,013 | 2/1988 | Epperson | 242/231 |
| 5,035,374 | 7/1991 | Kaneko | 242/264 |
| 5,042,741 | 8/1991 | Aota | 242/234 |
| 5,118,048 | 6/1992 | Childre et al. | 242/245 |

Primary Examiner—Daniel P. Stodola
Assistant Examiner—Michael Mansen
Attorney, Agent, or Firm—John E. Reilly

[57] ABSTRACT

An open-faced spin-casting reel utilizes a weighted member which in response to a casting motion will automatically release the line from the spool, and drag control mechanism is incorporated directly into the reeling mechanism off of the crankshaft to control the amount of drag on the line as it is reeled onto the spool.

20 Claims, 5 Drawing Sheets

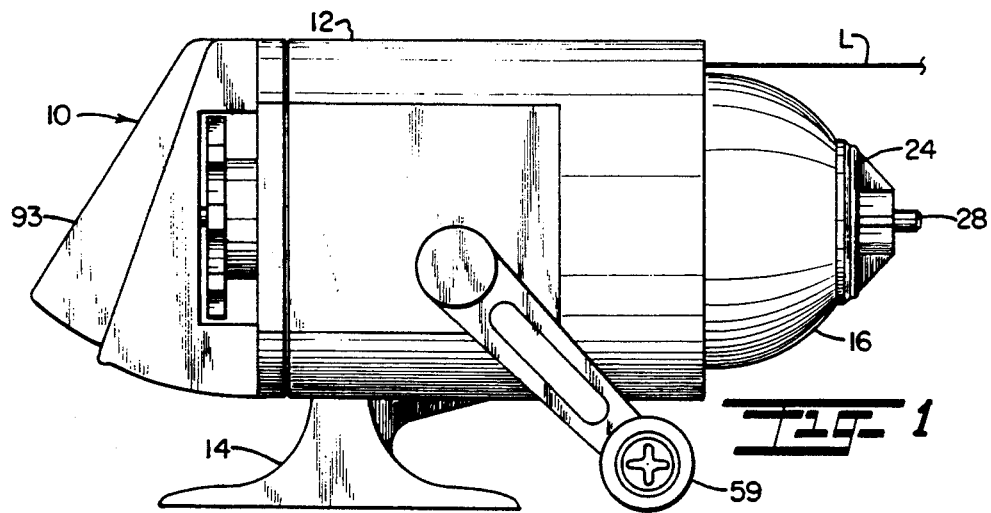
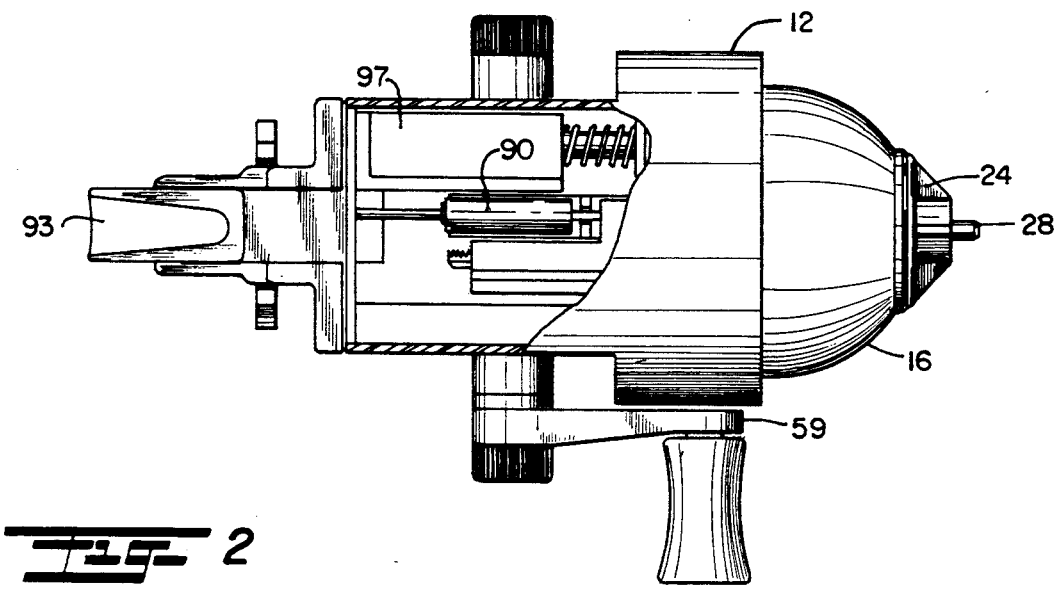
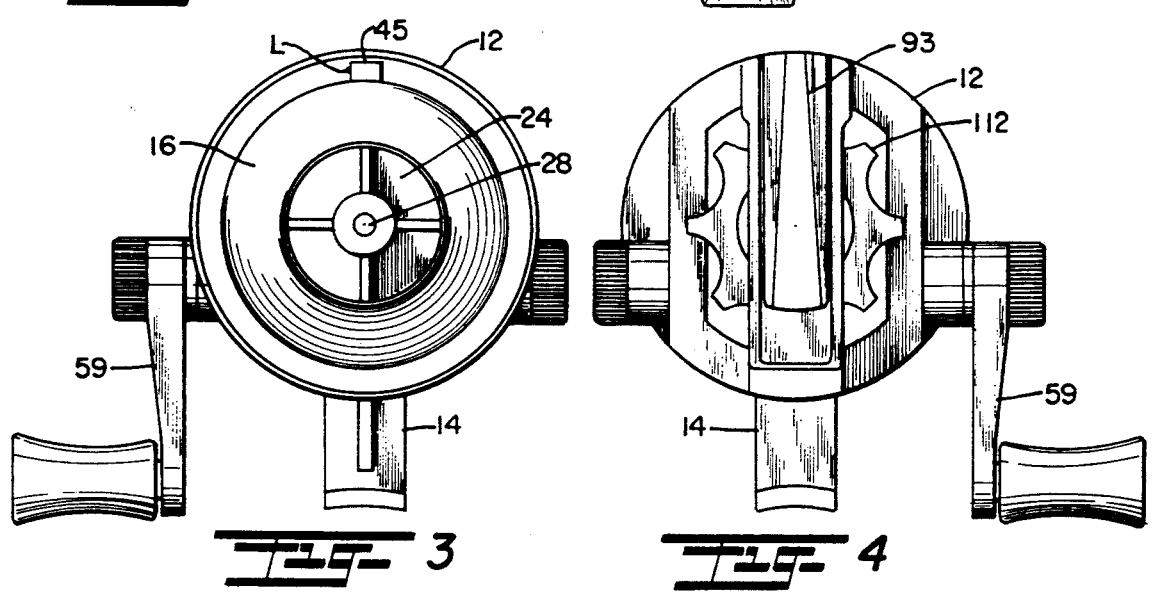

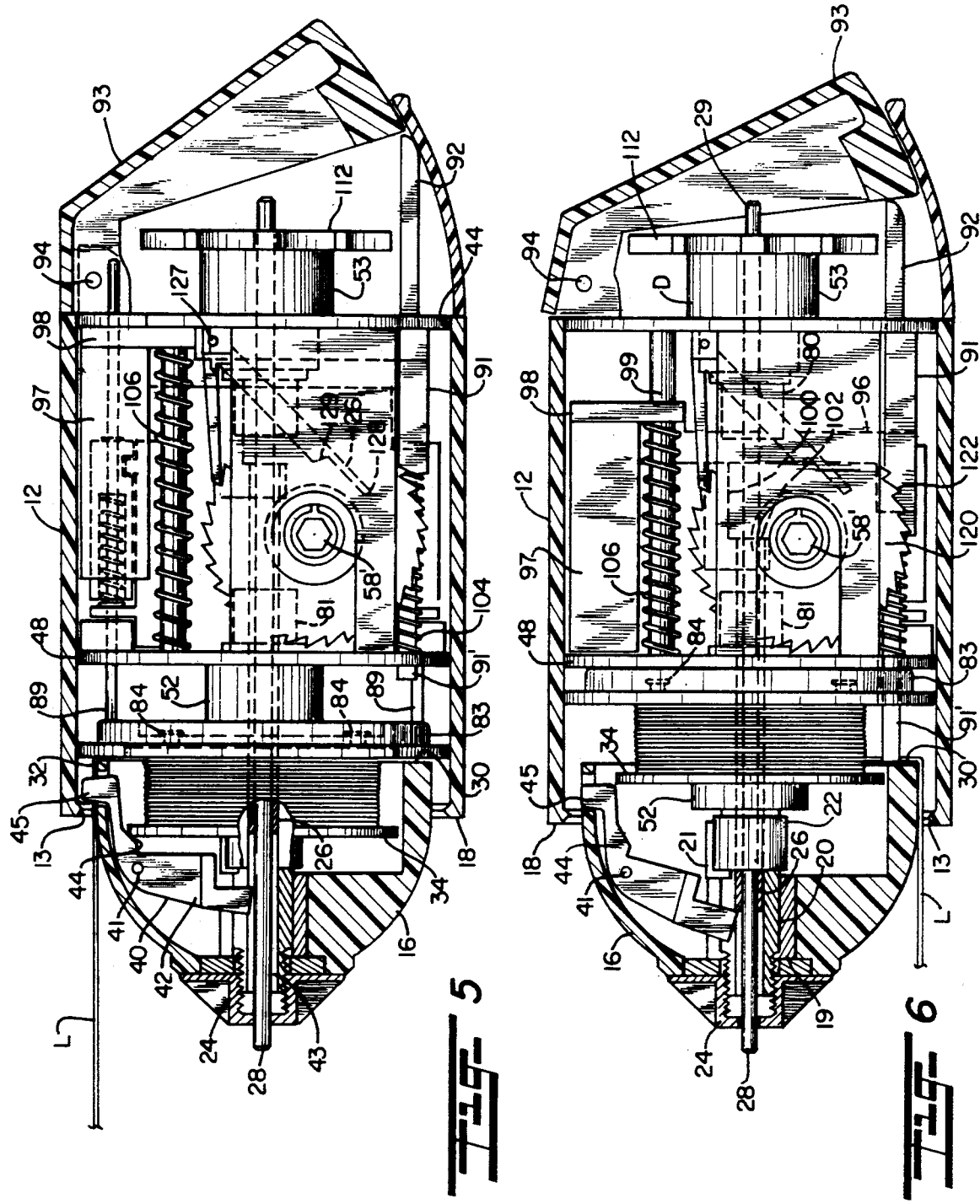

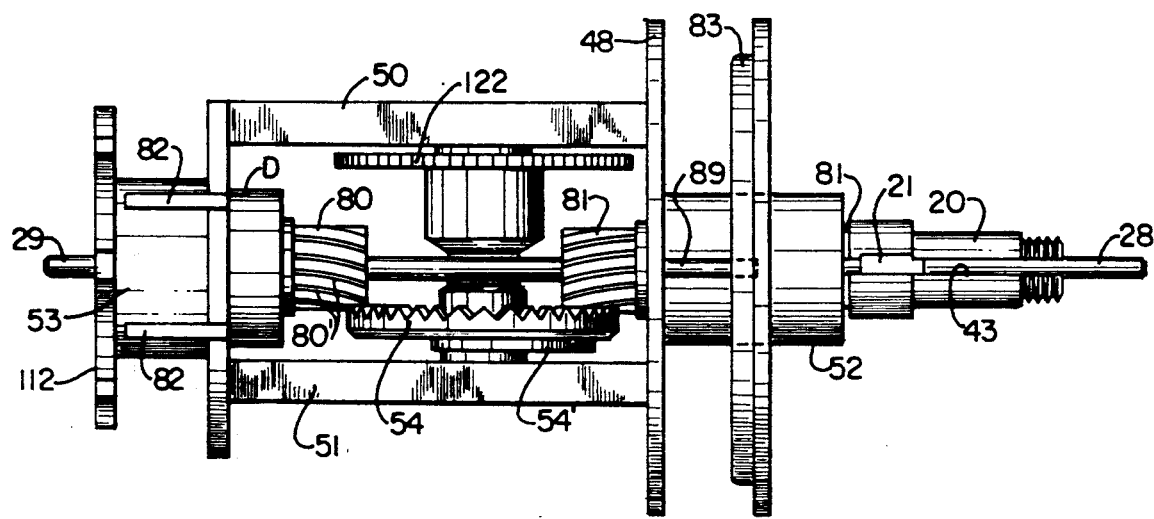
_FIG. 7_
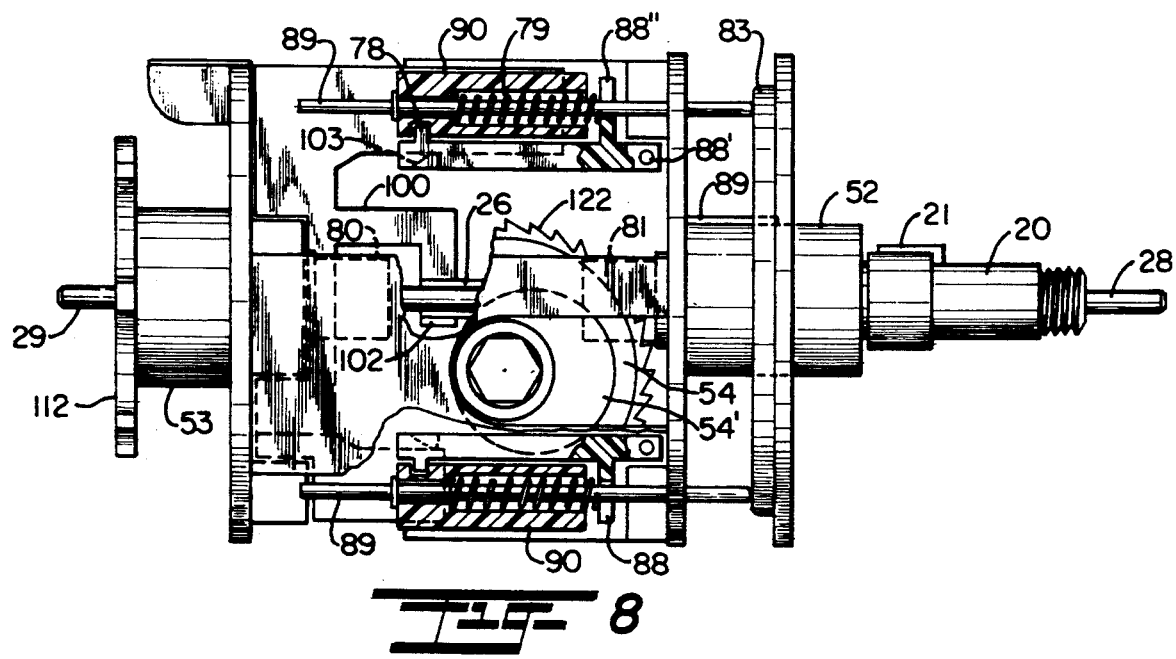
_FIG. 8_

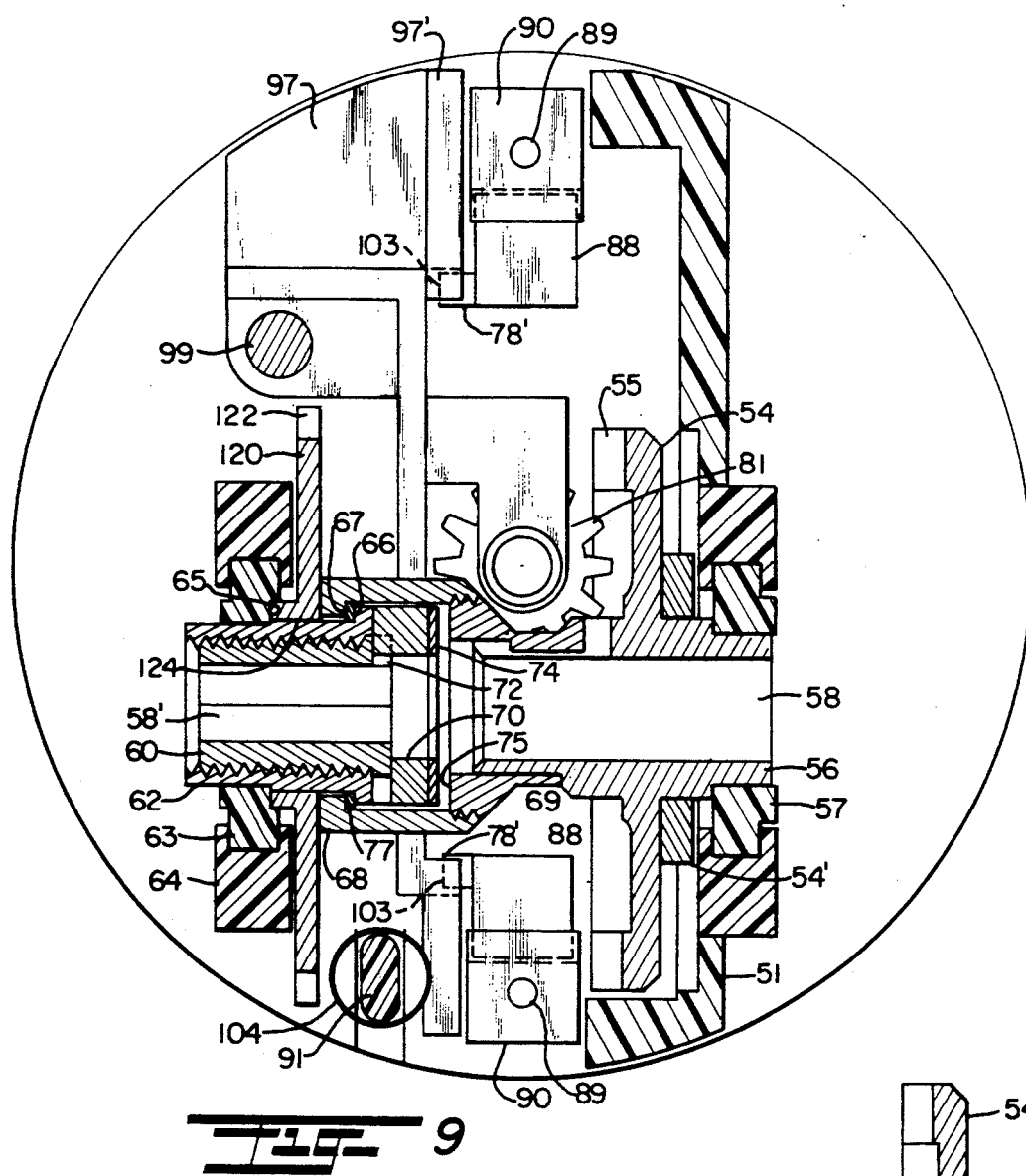
_FIG_ 9
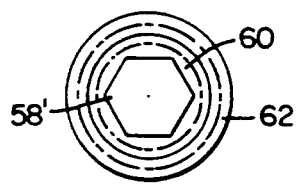
_FIG_ 11
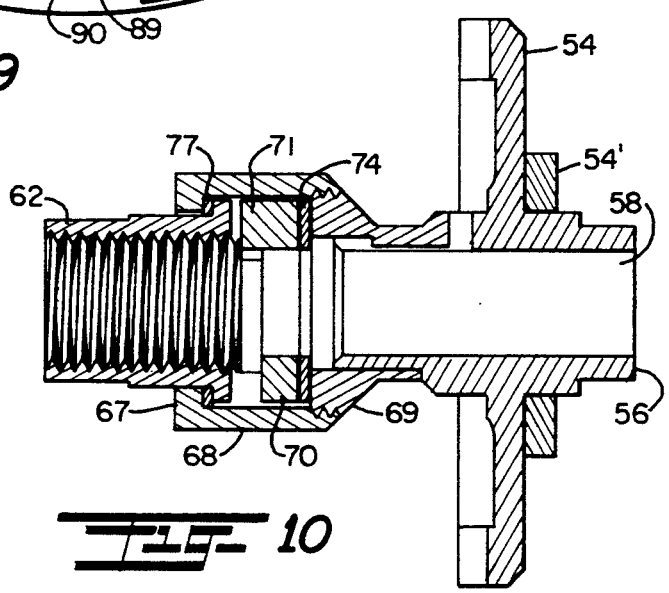
_FIG_ 10

CASTING REEL WITH AUTOMATIC DRAG AND CASTING MECHANISM

CROSS REFERENCE TO RELATED APPLICATIONS

This is a continuation-in-part application of Ser. No. 714,689, filed 13 Jun., 1991 for OPEN FACE SPIN CASTING FISHING REEL, by Frank E. Epperson, and now abandoned.

This invention relates to fishing reels; and more particularly relates to a novel and improved casting reel in which drag is automatically applied in response to reeling in the line, the drag can be varied by the crank handle and further wherein the force of the casting motion will automatically release the line for casting.

BACKGROUND AND FIELD OF THE INVENTION

It has been proposed to employ a drag mechanism in fishing reels which will automatically restrain or resist movement of the line when the line is being reeled in. Representative of this approach are U.S. Pat. No. 4,278,217 to Blackwell and U.S. Pat. No. 3,326,492 to Murval. In the patent to Blackwell, for example, the drag is increased or decreased according to the increase or decrease in the reeling radius of the line and also requires the use of a star wheel to control the amount of drag. Similarly, in the patent to Murval, the initial drag setting is established by a star wheel and the drag can be controlled by backing off the crank arm for a spool which is mounted directly on the crank arm or shaft. Other patents of interest in this field are U.S. Pat. No. 4,352,474 to Kovalovsky and U.S. Pat. No. 5,035,374 to Kaneko.

Casting reels present somewhat different problems in order to impart a drag automatically in response to cranking or reeling in of the line, since the spool is not directly associated with the crankshaft and requires an intermediate drive mechanism between the crankshaft and spool to selectively impart rotation to the spool. Moreover, it is desirable that the adjustable or manual drag mechanism be directly associated with the drive shaft for the spool but not affect the manner in which automatic drive is imparted by the crankshaft when reeling in the line. In this respect, minimal rotation of the crankshaft should impart sufficient drag to the spool to effectively lock it against rotation and require but a limited amount of rotation of the crank in the reverse direction to completely release the drag so that the nose is controlled by the conventional drag mechanism. In this way, automatic drag can be applied independently of the conventional or adjustable drag mechanism and can be released by the operator with a simple motion associated with cranking when necessary.

It is also desirable to incorporate into a casting reel a line release which will automatically remove any drag on the line in response to the casting motion so that it is not necessary for the operator to coordinate release of the line with the casting motion or throw and therefore can concentrate entirely on the delivery and direction of the cast without separate manipulation of the line release.

Another desirable feature is to provide an automatic drag mechanism as well as an automatic casting mechanism as described which can be incorporated into conventional reels, such as, those described in my prior U.S. Pat. No. 4,725,013 and my copending application for patent Ser. No. 714,689, filed 13 Jun., 1991 for OPEN FACE SPIN CASTING FISHING REEL.

SUMMARY OF THE INVENTION

It is therefore an object of the present invention to provide for a novel and improved casting reel which is extremely versatile and easy to operate.

Another object of the present invention is to provide for a novel and improved casting reel in which the line is automatically released from the spool in response to a casting motion thereby greatly enhancing both the delivery and accuracy of the cast.

It is a further object of the present invention to provide for a novel and improved casting reel in which drag is automatically imparted to the line when the crankshaft is rotated and further wherein the drag can be selectively varied by manipulation of the crankshaft handle in either direction.

A further object of the present invention is to provide in a casting reel for a drag mechanism which is operative automatically and independently of a manual drag control and which will cooperate with a drive shaft in order to impart positive rotation to a line spool of the reel.

A still further object of the present invention is to provide an automatic drag mechanism for a casting reel in which any drag increase or decrease is independent of the reeling radius of the line wrapped around a spool.

It is an additional object of the present invention to provide a casting reel with a combined automatic drag and casting mechanism which is simple, rugged and dependable in use and wherein the combined drag and casting feature are readily conformable for use with conventional casting reels.

In accordance with the present invention, in a casting reel of the type having a nose member, a housing, a crankshaft internally of the housing with a crank handle at one end of the crankshaft and a spool at one end of the housing for a fishing line, the improvement comprises a drive shaft drivingly connected to the nose member including drive means for imparting the rotation of the crankshaft to the nose member in order to reel the line onto the spool, and first and second releasable locking means, the first locking means being movable in response to rotation of the crankshaft to engage the second locking means whereby to impart the rotation of the crankshaft to the second locking means, the second locking means being keyed to the drive means whereby to activate the drive means for rotation of the spool when the first locking means is moved into engagement with the second locking means.

Another feature of the present invention resides in a casting reel of the type described and which is further characterized by a nose member mounted for rotation at one end of the drive shaft with a pick-up member on the nose which is movable into the path of advancement of the fishing line in response to rotation of the crankshaft whereby to guide the fishing line onto the spool when the crankshaft is rotated, and an automatic casting control mechanism will activate the release means automatically in response to a forward casting motion of the reel. The automatic casting control mechanism may be utilized in the casting reel with or without the particular type of automatic drag control mechanism described but preferably is employed in association with a level wind mechanism which will reciprocate the spool toward and away from the nose member in response to rotation of the crankshaft for level winding of the fishing line onto the spool. Preferably, the casting control mechanism takes the form of a slidable weight member which is directly connected to the release means and, if desired, a manual casting control mechanism of a conventional type can be provided to activate the release means in the same manner as the automatic casting control mechanism.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 1 is a side view in elevation of the preferred form of reel in accordance with the present invention;

FIG. 2 is a top plan view of the preferred form of invention illustrated in FIG. 1;

FIG. 3 is a front view in elevation of the preferred form of reel;

FIG. 4 is a rear view in elevation of the preferred form of reel;

FIG. 5 is a side view partially in section and with portions broken away illustrating the relationship between parts during the reeling operation;

FIG. 6 is a side view partially in section with portions broken away illustrating the relationship between parts during the casting operation;

FIG. 7 is an enlarged top plan view, with the housing removed, of the spool drive mechanism in accordance with the present invention;

FIG. 8 is an enlarged side view in elevation, with the housing removed, of the spool drive mechanism and automatic casting members;

FIG. 9 is a cross-sectional view enlarged through the housing at the crankshaft and illustrating the details of the drag control mechanism in the released position;

FIG. 10 is another cross-sectional view similar to FIG. 9 but illustrating the drag control mechanism in the engaged position;

FIG. 11 is an end view of the drag control mechanism illustrated in FIGS. 9 and 10;

DETAILED DESCRIPTION OF PREFERRED EMBODIMENT

Figure 12:
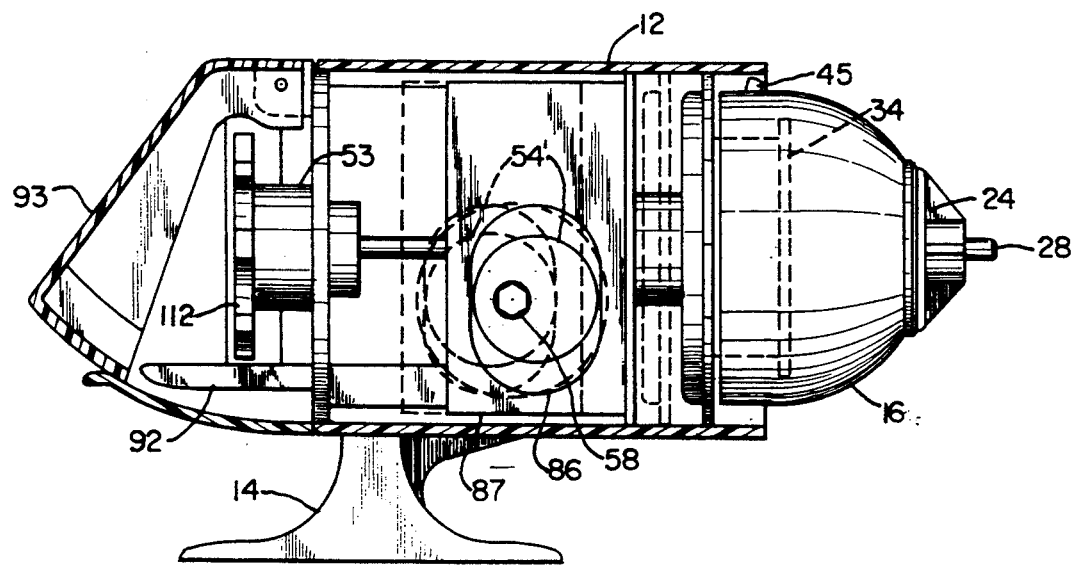
FIG. 12 is a side view partially in section illustrating the reciprocal motion of the slide frame in response to rotation of the crank shaft.
Figure 13:
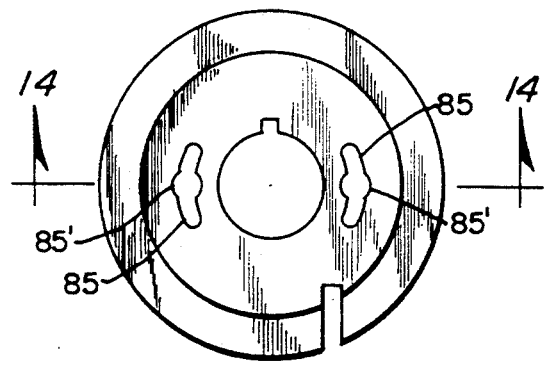
FIG. 13 is an end view of the support plate for the spool.
Figure 14:
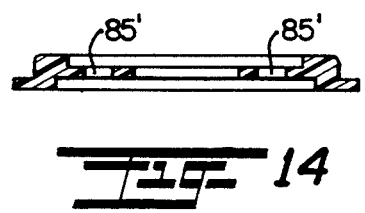
FIG. 14 is a cross-sectional view taken about lines 14—14 of FIG. 13.
Figure 15:
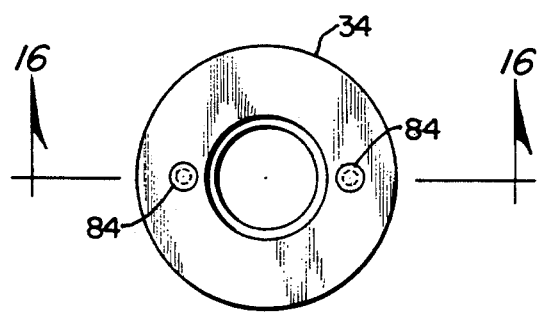
FIG. 15 is an end view of the spool.
Figure 16:
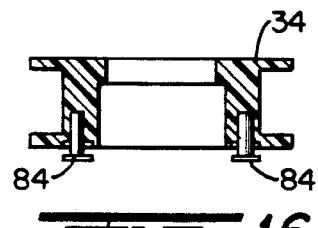
FIG. 16 is a cross-sectional taken about lines 16—16 of FIG. 15.

Referring to the drawings, there is shown in FIGS. 1 to 16 a preferred form of spin casting reel 10 including an outer casing or housing 12 and a tang or lower attachment 14 to secure the reel 10 to a fishing rod in a conventional manner. A forward, generally conical nose member 16 converges away from a forward, open end 18 of the casing 12 and has a unitary central sleeve 19 disposed on a tubular shaft 20. An enlarged boss 22 is affixed to the forward end of a worm gear 81 and includes a key 21 inserted into a slot in the shaft 20 to impart the rotation of the worm gear 81 to the nose 16.

The shaft 20 has an externally threaded portion at its leading end which receives a nut 24 to securely mount the nose 16 on the shaft 20. The shaft 20 is journaled in outer concentric relation to a releasable tube 26 which in turn is slidably disposed on an inner concentric solid shaft 28. The shaft 28 extends throughout the length of the casing 12 and terminates in a rearward end 29 beyond the rearward end of the casing 12.

The nose member 16 has a generally spherical or rounded end wall which diverges rearwardly and terminates in a generally cylindrical skirt 30. A generally rectangular slot or recess 32 is formed in the skirt, and a fishing line L extends from a spool 34 over the trailing edge of the skirt.

A line pick-up member is defined by a lever arm 40 which is pivotally mounted as at 41 within the hollow interior of the nose 16 and includes a downwardly projecting leg 42 which is movable through an axially extending slot 43 in the shaft 20 to engage the leading end of the tube 26. In turn, an upper leg 44 of the lever has a vertically upwardly extending, free pick-up end 45 which is movable through the slot 32 to engage the line L. When the lever 40 is advanced between the inwardly disposed release position shown in FIG. 6 to a radially outwardly disposed pick-up position, as shown in FIG. 5, it will move into the path of the line to prevent it from playing off of the spool 34.

The casing 12 is of hollow cylindrical configuration and has an inwardly directed rim 13 at its leading end. A support frame is mounted within the casing, the support frame having spaced, parallel end plates 48 and 49 interconnected by spaced parallel sidewalls 50 and 51, as shown in FIGS. 7 and 8. A hub 52 extends forwardly from the front end wall 48, and a second hub 53 extends rearwardly from the end wall 49, the hubs 52 and 53 being coaxially aligned and in outer concentric relation to the central tube 28 as well as the shaft 26.

Referring to FIGS. 9 and 10, a circular gear 54 having circumferentially spaced gear teeth 55 includes a central hub 56 which is journaled by bearing 57 in the sidewall 51 and sized to receive crankshaft 58 on a reel handle 59, the crankshaft 58 being freely rotatable independently of the hub 56 of the gear 54. An automatic drag control mechanism is mounted in the opposite sidewall 50 including an inner, externally threaded sleeve 60 having an inner wall of hexagonal cross section, as best seen from the end view in FIG. 11, to receive the hexagonal end 58' of the crankshaft 58. An outer, internally threaded sleeve 62 is mounted for slidable movement through an opening in a gear 120 by means of an outer bearing 63 and outer race 64 for the bearing 63 which is fixed to the outer wall of the gear 120. The bearing 63 is disposed on the external surface of the sleeve 62 just outwardly of a first external shoulder 65, and a second external shoulder 66 at the inner end of the sleeve 62 is movable toward and away from the internal shoulder 67 on a ring 68. The ring 68 is mounted in the sidewall 50 and engages a circular end portion 69 which is keyed to the hub 56. A washer 70 is interposed between the outer sleeve 62 and end portion 69 and includes an axially directed offset key 71 which interengages with keys or offset elements 72 at the inner end of the sleeve 62. The washer 70 is dimensioned to have an outer diameter corresponding to that of the external shoulder 66 and includes an annular friction plate 74 in facing relation to the member 69 and which follows the movement of the washer 70 into engagement with a squared end surface 75 on the member 69.

Another friction washer 77 is interposed between the external shoulder 66 and an internal shoulder 78 of the member 68. Accordingly, rotation of the crankshaft 58 will cause rotation of the inner sleeve 60 through the hexagonal end 58' and, since both the inner sleeve 60 and outer sleeve 62 are given lefthand threading, will cause the inner sleeve to advance toward the circular gear 54 so as to cause the friction washer 74 to engage the end surface 75; and simultaneously the outer sleeve 62 will advance in a direction away from the circular gear 54 thereby causing the external shoulder 66 to force the friction washer 77 against the internal shoulder 67 of the ring member 68. The threading is such that approximately one revolution of the crankshaft is necessary to cause the sleeve members to reach their fullest extent of movement and, through the friction washers 74 and 77, impart the rotation of the crankshaft 58 to the circular gear 54. Conversely, reverse rotation of the crankshaft will draw the sleeve members 60 and 62 away from engagement with the end surface 75 and shoulder 67.

As illustrated in FIG. 7, the gear 54 intermeshingly engages a pair of axially spaced worm gears 80 and 81, the gear 80 having gear teeth 80' at one end and circumferentially spaced tabs 82 which limit movement of the worm gear 80 with respect to the end of the hub 53 on the end wall 49. As shown in FIGS. 13 to 16, the spool 34 has a pair of circumferentially spaced pins 84 with enlarged ends which are removably inserted into slots 85 in the facing surface of a spool support plate 83, the spool 34 and the plate 83 being supported on and axially slidable with respect to the hub 52. An enlarged entrance 85' is provided for insertion of each of the enlarged ends of the pins 84 into a slot so that the spool will not axially separate from the support plate 83 when reciprocated in a manner to be described. In order to disengage or replace the spool 34, it is merely necessary to realign the enlarged ends of the pins 84 with the enlarged entrances 85' and remove the spool from the support plate 83. The worm gear 81 extends through the hub 52 and terminates in the boss 22 which is keyed to the shaft 20. In this way, as the worm gear 81 is rotated it will impart rotation via hub 52, boss 22 and drive sleeve 20 to the nose member 16 whereby to rotate the nose portion 16 during the reeling operation.

As further shown in FIG. 12, an eccentric shoulder 54' on the drive gear 54 rides within a generally oval-shaped track 86 in a rectangular slide frame 87 whereby rotation of the crankshaft will impart reciprocal motion to the frame 87 between the dotted and full line positions shown in FIG. 12. As further shown in FIGS. 2, 5, 6 and 9, a pair of upper and lower axially directed rods 89 are disposed for slidable movement through the end wall 48 and are in connected relation to the support plate 83. Upper and lower guide sleeves 90 are mounted on each respective rod 89 to follow the reciprocal movement of a carrier 88 which is pivotally attached as at 88' to upper and lower corners of the slide frame 87. Thus, the reciprocal movement of the slide frame 87 is imparted through the rods 89 to the support plate 83 and attached spool 34. Normally, each guide sleeve 90 is fixed for axial movement with the carrier 88 by a rib 78 at the free pivotal end of the carrier 88, the rib being inserted into a complementary groove in the sleeve 90 and held under spring tension by a coiled spring element 79 which bears against an end stop 88" adjacent to the pivotal end 88'.

In order to manually control the casting operation, a push rod 91 is slidably positioned beneath the slide frame 87 and includes a rearward extension 92 in the path of travel of a pivotal thumb button control member 93 and a forward end 91'. The member 93 is pivotal about an upper pivot pin 94 between a rearwardly extending position, as shown in FIG. 5, and a depressed position, as shown in FIG. 6. An arm 96 extends upwardly from the push rod for connection to an upper weighted slide member 97 which is slidably mounted by a yoke 98 to a support rod 99 extending horizontally between the end plates 48 and 49. In addition, the arm 96 carries a forward extension arm 100 having a downwardly extending yoke portion 102 attached to the rearward end of the shaft 26. When the push rod 91 is driven forwardly by the cast control member 93, the forward extension 100 will cause the release tube 26 to advance forwardly into engagement with the lower end of the leg 42 of the line control lever 40 to cause downward pivotal movement of the line pick-up member 45 out of the path of the line L, and the forward end 91' is advanced into engagement with the skirt 30 of the nose member 16 so as to move across the path of travel of the line L and prevent it from unwinding off of the reel when the fisherman is preparing to cast. Lateral extensions 103 disposed at upper and lower ends of the arm 96 have beveled edges which are complementary to beveled edges on lateral extensions 78' of the upper and lower carriers 88. Accordingly, as the push rod 91 advances forwardly, the lateral extensions 103 will engage the extension 78' to cause the carriers 88 to pivot away from engagement with the guide sleeves 90 so that the guide sleeves 90 are then free to drive the rods 88 and attached spool rearwardly against the end wall 48 under the urging of the spring elements 79. This action will occur simultaneously with the retraction of the line pick-up member 45 at the start of the casting operation.

When the cast control member 93 is released toward or at the end of the cast, a return spring 104 on the push rod 91 will cause the push rod 91 and its extension 91' to be retracted rearwardly and force the control member 93 to return to the raised or extended position shown in FIG. 5. Similarly, a return spring 106 on the rod 99 will cause the weighted casting member 97 to return to the rearward position shown in FIG. 5. Preferably, the weighted member 97 is composed of a high density material, such as, lead which is elongated and of a generally triangular cross section so as to fit compactly within the housing 24. The weighted member 97 is affixed to an elongated bar 97' which carries the yoke 98, and the bar 97' is slidable along one side of the upper guide sleeve 90, as shown in FIG. 9.

As an alternative to the manual casting operation, the weighted member 97 will in response to the centrifugal force of the forward throw of the reel in the casting motion cause the release tube 26 to advance forwardly against the line pick-up lever 40 to retract the upper end 45 away from the path of the line L so that the line will freely play off the end of the spool 34 and the outer skirt 30 of the nose 16. At the end of the forward throw, the return spring 106 will cause the weighted member 97 to move rearwardly along the support rod 99 and carry the release arm 100 rearwardly with it so that the hollow shaft 26 will be retracted away from engagement with the pickup leg 42. The line L is then set in the usual fashion by cranking the reel in a counterclockwise direction, as viewed in FIGS. 5 and 6, to cause the spool 34 and plate 83 to move forwardly until the leading outer edge of the spool 34 engages the angled portion 44' of the pickup arm 40 to urge it back into the position shown in FIG. 5 so as to be in the path of the line L. As this occurs, the slide frame 86 will cause the carriers 88 and their ribs 78 to reestablish engagement with the guide sleeves 90 since the rearward pressure of the end stops 88" against the spring ends 79 will cause the carrier to pivot upwardly until the ribs 78 are fully inserted into the complementary grooves on the sleeves 90. As the slide frame is reciprocated by the crankshaft 58 the guide sleeves will then cause the rods 89 to reciprocate in the manner described in reeling the line L onto the spool 34. During the reeling operation, when the rotation of the crankshaft 58 is imparted through the worm gear 81 to the nose member 16, the pick-up end 45 will remain in the path of the line owing to the frictional engagement between the line L and the end 45 as well as the pressure exerted by the line against the end 45 causing it to bear against the sidewall of the slot 32.

In order to adjustably control resistance to rotation of the spool 34 when the line L is not being reeled onto the spool 34, a drag mechanism D is disposed at the rearward end of the shaft 28 behind the worm gear 80, the drag mechanism D corresponding to that set forth and described in my earlier copending application Ser. No. 714,689, filed 13 Jun., 1991 for OPEN FACE SPIN CASTING FISHING REEL and therefore is not shown in detail. The amount of drag is controlled by threaded adjustment of dial 112 at the rearward end of the drag mechanism D. Briefly, when the dial 112 is threaded inwardly, it will cause the drag mechanism D to increase the resistance to rotation of the worm gear 80 and transmit the same resistance through the gear 54, forward worm gear 81 and nose 16 to control the amount of tension on the line L.

An anti-reverse mechanism is provided in association with the crankshaft 58 and corresponds to that set forth and described in my prior U.S. Pat. No. 4,725,017. Referring to FIGS. 5, 6 and 9, a ratchet gear 120 having teeth elements 122 includes a central hub 124 mounted for rotation on the sleeve 62. A dog 126 is pivotal at 127 to the rear end wall 49 of the support frame and includes a shoulder 129 and downwardly extending arm 128, the arm bearing against the side of the ratchet gear 120. Accordingly, if the reel 58 should be reversed in rotation, or in a clockwise direction as illustrated in FIGS. 5 and 6, the gear 120 will cause the lower arm 128 to pivot downwardly and to carry the upper arm 126 with it to move the shoulder 129 into the path of rotation of a tooth element 122. However, the limited rotation that the crankshaft 58 is permitted to undergo is more than sufficient to cause the sleeve members 60 and 62 to reverse their rotation as described to relieve the pressure on the friction plates 74, 77 and unlock the automatic drag control mechanism.

From the foregoing, it will be appreciated that a novel and improved form of open-face spincasting reel has been devised which is characterized in particular by utilization of a weighted member to automatically release the line pick-up member in response to the forward throw of the reel in a casting operation. This feature obviates the use of a manual casting control mechanism which requires that the fisherman manually release the line pick-up member in casting so that the fisherman can concentrate on the force or speed and accuracy of the throw. In this relation, the weighted member 97 will give the fisherman a definite feel for the optimum force and acceleration to be used in releasing the line and then rotating the crankshaft 58 to terminate the cast by advancing the line pick-up member 45 back into the path of advancement of the line. The line pick-up member 45 as devised also affords a definite advantage in working in cooperation with the slot 43 in the nose portion to move into the path of advancement of the line L where it passes between the skirt 30 of the nose portion and the leading edge 18 of the housing 12 so that the line L will bear against one side of the pick-up member 45. This frictional engagement between the fishing line L and pick-up member 45 will prevent the pick-up member from retracting inwardly through the slot as the spool is reciprocated toward and away from the pick-up member in the reeling or level wind operation. The manual casting control mechanism is still available to the fisherman if, for example, it is desired to make shorter casts or experience difficulty for any reason in imparting the necessary force to activate the automatic casting control mechanism.

The automatic drag control mechanism is preferably designed such that a single rotation of the crankshaft will cause the sleeve members to move into firm locking engagement with the friction washers in order to rotate the drive shaft and nose portion in concert with the reciprocation of the spool by the eccentric cam on the drive gear. This automatic drag feature operates independently of the variable drag mechanism which normally regulates the tension on the line. As the line is being reeled in, the drag can be selectively controlled by forward or reverse rotation of the crankshaft handle. In other words, the forward rotation of the handle will lock the nose member 16 for rotation with the crankshaft; and if desired to lessen the drag, the crankshaft handle 59 is rotated in the reverse direction to remove the pressure on the friction washer 74, 77 and rely entirely on the variable drag setting of the drag mechanism D.

It is therefore to be understood that while a preferred form of casting reel is herein set forth and described, the above and other modifications and changes may be made without departing from the spirit and scope of the present invention as defined by the appended claims and reasonable equivalents thereof.

I claim:

1. In a casting reel wherein there is provided a housing, a crankshaft internally of said housing with a handle projecting from one end of said crankshaft, a line pick-up member, and a spool at one end of said housing for a fishing line, the improvement comprising;

a drive shaft drivingly connected to said line pick-up member including drive means for imparting rotation of said crankshaft to said line pick-up member in order to reel said line onto said spool; and first and second releasable drag means to selectively impart rotation of said crankshaft to said drive shaft, said first drag means being axially movable in response to rotation of said crankshaft in one direction to frictionally engage said second drag means whereby to gradually impart the rotation of said crankshaft to said second drag means, said second drag means being drivingly connected to said drive means whereby to cause said drive means to rotate said line pick-up member when said first drag means is moved into engagement with said second drag means, said second drag means including at least one frictional surface member, and said first drag means including at least one sleeve member movable in response to rotation of said crankshaft in the one direction into engagement with said friction plate member and said first drag means being further movable in a direction away from said second drag means in response to rotation of said crankshaft in the opposite direction whereby to release said second drag means from locking engagement with said first drag means.

2. In a casting reel according to claim 1, said drive means including a drive gear in spaced relation to said crankshaft, said second drag means drivingly connected to said drive gear, and a driven gear fixed for rotation on said drive shaft in response to rotation of said drive gear.

3. In a casting reel according to claim 1, said second drag means including a pair of axially spaced annular frictional surface members, and said first drag means including a pair of inner and outer concentric sleeve members interposed between said annular friction plate members and movable in opposite directions with respect to one another in response to rotation of said crankshaft into frictional engagement with said annular frictional surface members.

4. In a casting reel according to claim 3, said concentric sleeves being threadedly engageable with one another whereby rotation of one of said sleeves will cause said sleeves to advance in opposite axial directions with respect to the axis of said crankshaft.

5. In a casting reel according to claim 4, including anti-reversing means on said crankshaft for limiting rotation of said crankshaft in a direction reverse that of reeling in said fishing line.

6. In a casting reel according to claim 1, including variable drag means engageable with said drive shaft independently of said first and second drag means to regulate the resistance to rotation of said spool in response to tension applied to said fishing line.

7. In a casting reel according to claim 1, wherein said line pick-up member includes a nose portion mounted for rotation on said drive shaft, reciprocating means for reciprocating said spool toward and away from said nose portion in response to rotation of said crankshaft, and fishing line pick-up means on said nose portion being movable into the path of advancement of said fishing line in response to rotation of said crankshaft whereby to guide said fishing line onto said spool when said crankshaft is rotated.

8. In a casting reel according to claim 7, wherein release means are movable into engagement with said pick-up means for retracting said pick-up means out of the path of movement of said fishing line, and casting control means for moving said release means into engagement with said pick-up means solely in response to centrifugal force resulting from a forward casting motion of said reel.

9. In a casting reel according to claim 8, said release means including a release tube coaxial with said drive shaft, said tube movable forwardly into engagement with said line pick-up means by said casting control means.

10. In a casting reel according to claim 9, wherein said casting control means is defined by a slidable weighted member engageable with said release tube.

11. In a casting reel according to claim 8, wherein manual control means are provided for engaging said release means to retract said pick-up means out of the path of movement of said fishing line.

12. In a casting reel according to claim 7, wherein means are provided for pivotally mounting said pick-up means in said nose portion and said pick-up means including a free end portion movable through a slot in said nose portion into the path of advancement of said fishing line.

13. In a casting reel according to claim 7, wherein said reciprocating means is movable into engagement with said pick-up means for moving said pick-up means into the path of advancement of said fishing line in response to rotation of said crankshaft.

14. In a casting reel wherein there is provided a housing, a crankshaft internally of said housing with a reel projecting from one end of said crankshaft, and a spool at one end of said housing for a fishing line, the improvement comprising:

a drive shaft;

a nose member mounted for rotation on said drive shaft;

said drive shaft drivingly connected to said nose member including drive means for imparting rotation of said crankshaft to said nose member in order to reel said line onto said spool;

fishing line pick-up means on said nose member being movable into the path of advancement of said fishing line in response to rotation of said crankshaft whereby to guide said fishing line onto said spool when said crankshaft is rotated;

release means for retracting said pick-up means out of the path of movement of said fishing line; and casting control means for activating said release means in response to centrifugal force resulting from a forward casting motion of said reel.

15. In a casting reel according to claim 14, wherein reciprocating means are provided for reciprocating said spool toward and away from said nose member in response to rotation of said crankshaft.

16. In a casting reel according to claim 14, said release means including a release tube coaxial with said drive shaft, said tube movable forwardly into engagement with said line pick-up member when activated by said casting control means.

17. In a casting reel according to claim 16, wherein said casting control means is defined by a slidable weight member engageable with said release tube.

18. In a casting reel according to claim 14, wherein means are provided for pivotally mounting said fishing line pick-up means in said nose member and said pick-up means including a free end portion movable through a slot in said nose member into the path of advancement of said fishing line.

19. In a casting reel according to claim 14, wherein said reciprocating means is operable to advance said spool into engagement with said pick-up means for moving said pickup-up means into the path of advancement of said fishing line in response to rotation of said crankshaft.

20. In a casting reel according to claim 14, wherein manual control means is provided for manually activating said release means to retract said fishing line pick-up means out of the path of movement of said fishing line.

* * * * *